United States Patent
Häntsch

(10) Patent No.: US 9,531,851 B2
(45) Date of Patent: Dec. 27, 2016

(54) MODULAR ADJUSTING DEVICE, IN PARTICULAR FOR RF DEVICES

(71) Applicant: KATHREIN-WERKE KG, Rosenheim (DE)

(72) Inventor: Ralf Häntsch, Raubling (DE)

(73) Assignee: KATHREIN-WERKE KG, Rosenheim (DE)

( * ) Notice: Subject to any disclaimer, the term of this patent is extended or adjusted under 35 U.S.C. 154(b) by 0 days.

(21) Appl. No.: 14/894,764

(22) PCT Filed: Mar. 27, 2014

(86) PCT No.: PCT/EP2014/000836
§ 371 (c)(1),
(2) Date: Nov. 30, 2015

(87) PCT Pub. No.: WO2014/191069
PCT Pub. Date: Dec. 4, 2014

(65) Prior Publication Data
US 2016/0173665 A1   Jun. 16, 2016

(30) Foreign Application Priority Data
May 31, 2013   (DE) .......................... 10 2013 009 224

(51) Int. Cl.
*H01Q 3/00*    (2006.01)
*H04M 1/02*    (2006.01)
(Continued)

(52) U.S. Cl.
CPC ............. *H04M 1/0254* (2013.01); *F16H 1/14* (2013.01); *F16H 57/021* (2013.01); *H01Q 1/125* (2013.01); *H01Q 3/12* (2013.01); *H01Q 3/32* (2013.01)

(58) Field of Classification Search
USPC ................................................. 343/757–771
See application file for complete search history.

(56) References Cited

U.S. PATENT DOCUMENTS 3,665,482 A * 5/1972 Cresswell ................ H01Q 3/08
                                                    343/765
4,862,185 A * 8/1989 Andrews .................. H01Q 3/20
                                                    343/761
(Continued)

FOREIGN PATENT DOCUMENTS

CN       202 616 071         12/2012
DE       41 41 150           6/1992
(Continued)

OTHER PUBLICATIONS

English translation of the International Preliminary Report on Patentability and Written Opinion of the International Searching Authority mailed Dec. 10, 2015, issued in corresponding International Application No. PCT/EP2014/000836.
(Continued)

*Primary Examiner* — Creighton Smith
(74) *Attorney, Agent, or Firm* — Nixon & Vanderhye P.C.

(57) ABSTRACT

An improved modular adjusting device, in particular for RF devices, is distinguished, inter alia, by the following features: —having at least one transmission base module (113) and at least two transmission elements (17; 29, 31), —the at least one transmission base module (113) also has at least one second transmission element (31) and an associated snap-action and/or latching device (16), —the at least one second transmission element (31) is held and secured in a snap-in manner by the associated snap-action and/or latching device (16), —the snap-action and/or latching device (16) for holding and securing the at least one second transmission element (31) is designed in such a manner that the at least one second transmission element (31) is held in a manner limited by stops in the axial direction (X), and— the first and second transmission elements (29, 31) each have a plug-in coupling region (21) in which the shaft (13)

(Continued)

or one of the shaft sections (13.1, 13.2, 13.3, 13.4) is connected in a rotationally fixed manner using a plug-in connection.

26 Claims, 10 Drawing Sheets

(51) Int. Cl.
    *F16H 57/021* (2012.01)
    *H01Q 1/12* (2006.01)
    *H01Q 3/12* (2006.01)
    *H01Q 3/32* (2006.01)
    *F16H 1/14* (2006.01)

(56) References Cited

U.S. PATENT DOCUMENTS

| | | | | |
|---|---|---|---|---|
| 5,982,333 | A * | 11/1999 | Stillinger | H01Q 3/08 342/359 |
| 6,313,805 | B1 * | 11/2001 | Nishiyama | H01Q 3/04 343/766 |
| 6,398,444 | B1 * | 6/2002 | Salmela | F16F 15/073 267/160 |
| 7,102,588 | B1 * | 9/2006 | Phelan | H01Q 3/08 343/757 |
| 7,358,909 | B2 * | 4/2008 | Sherwood | H01Q 1/084 343/713 |
| 8,836,597 | B1 * | 9/2014 | Vizzio | H01Q 3/04 343/757 |
| 2002/0196193 | A1 * | 12/2002 | Butler | H01Q 1/28 343/766 |
| 2008/0278396 | A1 * | 11/2008 | Blalock | H01Q 3/08 343/761 |
| 2010/0292845 | A1 * | 11/2010 | Burdette | H01Q 3/04 700/275 |
| 2011/0267231 | A1 | 11/2011 | Le et al. | |
| 2013/0021214 | A1 * | 1/2013 | Zimmerman | H01Q 3/08 343/761 |
| 2014/0333500 | A1 * | 11/2014 | Moon | H01Q 1/1264 343/758 |

FOREIGN PATENT DOCUMENTS

| | | |
|---|---|---|
| DE | 42 16 332 | 11/1993 |
| DE | 101 07 601 | 8/2002 |
| DE | 101 60 056 | 9/2002 |
| DE | 10 2010 012 991 | 12/2011 |
| DE | 10 2012 103 886 | 11/2012 |
| EP | 0 087 672 | 9/1983 |
| WO | WO 02/061877 | 8/2002 |
| WO | WO 2009/102775 | 8/2009 |

OTHER PUBLICATIONS

International Search Report for PCT/EP2014/000836, mailed Jun. 13, 2014, 4 pages.
Written Opinion of the ISA for PCT/EP2014/000836, foreign language, mailed Jun. 13, 2014, 7 pages.

* cited by examiner

MODULAR ADJUSTING DEVICE, IN PARTICULAR FOR RF DEVICES

This application is the U.S. national phase of International Application No. PCT/EP2014/000836 filed 27 Mar. 2014, which designated the U.S. and claims priority to DE Patent Application No. 10 2013 009 224.8 filed 31 May 2013, the entire contents of each of which are hereby incorporated by reference.

The invention relates to a modular adjusting device, in particular for RF devices, in accordance with the preamble of claim 1.

Numerous applications are known in which adjusting devices are required for actuating control elements, in particular in the field of high-frequency technology.

It is thus known for example from WO 02/061877 A2 to adjust phase shifters in the interior of an antenna housing (radome) accordingly so as to change what is known as the down-tilt angle, using a beam shaping device known as an RET unit. This can take place in a motorised manner, for example by way of an RET unit which can be attached outside the antenna housing.

However, more and more components, including electronically active components such as filter assemblies, amplifier units etc., are being accommodated in the interior of the antenna housing, and so there is less and less space available. It is therefore necessary for example for the phase shifters which are optionally provided in the antenna to be driven by an external adjusting device, such as an RET unit, via a suitable transmission device.

WO 2009/102775 A2 discloses a multi-beam-shaping device. This multi-beam-shaping device comprises for example three down-tilt adjusting devices for manual operation, which each comprise an adjustment axle, said axles protruding at the lower cover plate of the antenna housing and being provided with an adjustment rim, where the down-tilt angle can be individually manually adjusted.

DE 10 2010 012 991 B4 proposes driving, and thus adjusting, various control elements (for example for reducing the down-tilt angle) by means of a multi-beam-shaping device, corresponding mechanical interfaces and/or coupling points being provided for this purpose.

In this case, it is generally necessary to configure the drive train in the interior of the antenna housing, by way of appropriate deflection transmissions, for example in the form of angular transmissions and/or worm transmissions, in such a way that for example the phase shifters (or other control assemblies) placed at various points in the interior of the antenna housing can be driven, adjusted and thus set accordingly by the preferably motorised drive devices (generally outside the antenna housing).

Adjusting devices of this type may for example comprise an angular transmission having mitre gears and a housing arrangement made of die-cast zinc. Therein, a steel shaft is inserted into sleeve-shaped shaft receivers, a mitre gear consisting for example of plastics material being placed on the opposite ends of said shaft and being fixable thereto by means of a set screw. The second drive train of the mitre gear transmission may also be of a corresponding construction.

However, the configuration of a drive train of this type is very complex in individual cases, since a plurality of deflections may be required, and the corresponding parts require significant effort to assemble.

A generic prior art comprising a worm component is known from DE 101 07 601 A1. The worm component comprises two mutually axially offset mounting regions for mounting in a housing of a control drive having associated washers for axial mounting. For mounting in the housing, a first receiving block and a second receiving block which is axially offset therefrom are provided, into which the bearing portions of the worm can be inserted and by means of which the worm can be held. The washers formed on the worm shaft delimit the axial length of the first and second mounting region of the worm, by means of which said worm is ultimately axially stopped and can mesh with a worm gear accommodated in the transmission housing.

DE 101 60 056 A1 discloses a geared drive for an electric motor. The geared drive comprises a worm-shaped shaft, which meshes with a worm gear, the axle of the worm being held in associated bearings. In this case, the bearings for the worm shaft consist for example of resilient plastics material, so as to make relative movements therebetween possible, in such a way that the axle can be received between the clearances in snap-in contact.

Lastly, a reduced-play worm transmission is also known from DE 42 16 332 A1. On one or both sides of the actual worm region of the worm shaft, cylindrical shaft regions are formed, the bearing shells of which are associated with the radial bearing, specifically with at least one bearing installation for axially bracing the worm in one direction in each case.

By contrast, the object of the present invention is to develop an improved modular adjusting device, in particular using transmissions, by means of which different drive trains and/or drive paths, in particular for driving radiofrequency devices and assemblies, can be produced in a simple manner.

This object is achieved according to the invention by the features set out in claim 1. Advantageous embodiments of the invention are set out in the dependent claims.

The present invention provides a greatly improved modular adjusting device for RF devices and assemblies, which is distinguished by extreme simplicity along with maximum variability and adaptability.

The modular adjusting device according to the invention may be configured in such a way that a continuous drive connection to a control element, which is to be set and/or adjusted accordingly, can be constructed in a housing, for example in an antenna housing, via any desired deflection points. For example, phase shifters in the interior of the antenna housing, which may be placed at different points, can be arranged by way of an RET unit provided outside the antenna housing.

In particular in view of the high packing density of modern antenna arrangements and associated active components, which are provided in the antenna housing on the face of a reflector which receives the emitters or even on the rear face of the reflector, less and less space is left for configuring corresponding drive trains herein.

The invention is distinguished in particular in that in a preferred embodiment, modular drive transmission devices of this type can be constructed and used without any tools.

For this purpose, the invention uses transmission constructions and transmission connections each comprising a first and a second transmission member, which are in an operative connection with one another. The special feature here is that the two transmission members in a drive connection with one another, for example the two transmission members of an angular transmission (mitre gear transmission) or a worm transmission, can be installed, positioned and held on a corresponding transmission base module simply by pressing them into position using a snap-in connection.

In this context, the individual transmission members can be inserted into the snap-in connection and subsequently connected to an axial shaft. However, it is also possible for the relevant transmission member initially to be connected to an associated shaft and subsequently to be clipped into the corresponding snap-in site in the transmission module.

The individual drive members are preferably connected to the shafts using a plug-in connection. In this case, the shaft has in particular a non-round cross-section, for example an n-gon cross-section in the form of a regular hexagon, over the entire length thereof. The corresponding plug-in clearance on a relevant transmission member is shaped in such a way that the end of the shaft can be inserted into it. As a result of the non-round connection, a positive and non-positive connection in the form of a connection for conjoint rotation is always achieved in a simple manner.

Since the transmission base modules may for example be fixed to a reflector or at corresponding points in a housing, for example also using a snap-in or clip connection, the shafts may be of a length which is for example slightly shorter than the maximum free plug-in distance between two transmission members which are to be connected via the shaft. As a result, temperature-based length compensations can be provided without difficulty. Since the overlap between the shaft end and the plug-in receiver in a transmission member is of a sufficient size, it is ensured that a sufficient overlap is always left between the shaft and the shaft receiver in the transmission member, in other words the connection for conjoint rotation is always preserved, even if the temperature falls.

In a particularly preferred embodiment, different transmission base modules may be used. Thus, it is possible for example to use a transmission base module into which for example mitre gears can be inserted not only at a 90° angle, but at any desired predeterminable angle to one another. In this case, the transmission base modules may provide predefined angles. However, embodiments are also possible in which for example one transmission member can be inserted in a different angular position from the other.

Lastly, transmission base modules are also possible in which a drive connection can be provided through the base wall to the other face of a housing wall, a reflector etc.

Since it is further possible within the scope of the invention to make all of the components from dielectric material, in particular plastics material, it is also possible in particular to produce an intermodulation-proof modular adjusting device, and this is of major significance in particular for RF devices. This is because the use of electrically conductive parts, as was required in particular in prior art transmission embodiments, often led to intermodulation problems.

From this explanation, it can be seen that the invention can provide a number of advantages, such as the following:

- all joining processes can be carried out using snap-in connections;
- if for example mitre gears are used for the engaged transmission members, they can be assembled in succession without difficulty; a torque transmission chain can be closed by snapping in the final mitre gear, the order of assembly being as desired;
- the aforementioned advantages still apply equally even if an engaged transmission worm and worm gear are used for the transmission members instead of mitre gears;
- therefore, no additional fixing elements and no tools are required;
- the assembly can be performed entirely by hand in a simple and cost-effective manner;
- all of the parts may consist of plastics material, in such a way that the entire drive connection is actually made to be intermodulation-proof;
- the necessary parts for the mitre gear transmission, but also for a worm transmission, can be provided for example by injection moulding; this also leads to a reduction in costs;
- the snap-in connections between the individual transmission members and the mounting plate or housing arrangement holding the transmission members can be dimensioned in such a way that angle errors (for example up to 5°) in the shafts can be compensated without difficulty; likewise, height differences can also be bridged without difficulty;
- overall, within the scope of the invention, low-loss torque transmission can be made possible;
- the entire arrangement, in other words the construction of the engaged transmission members, only has a low space requirement; in this context, the invention is further distinguished by being of a very flat construction;
- in the case of the mitre gears, only one mitre gear toothing (which has a very expensive tool construction) is required; different drive output angles can be implemented using different mounting plates;
- a high adjustment precision is provided overall; and
- the shaft used within the scope of the invention can have a very high resilience, it being possible to form the shaft in such a way that it has the properties of a flexible shaft and thus makes high bending radii possible, but is equally very torsion-stable and thus rotationally stable.

Within the scope of the invention, the modular adjusting device can be used for a wide range of radiofrequency devices, for example antennae, filters, amplifiers, processing systems etc. There are no limitations in this regard.

The invention is described in greater detail below with reference to embodiments. In the drawings:

FIG. 17 is a drawing corresponding to FIG. 14 but with the housing cover for protecting the worm gear transmission put on.

FIG. 1 is a three-dimensional view of an open housing 1 shown by way of example, which housing can be locked conventionally using a cover (not shown in greater detail) which is placed on the housing walls 1.

In the embodiment shown, a first embodiment of a modular adjusting device according to the invention for RF devices is shown in the housing interior 3, which device is mounted on the base 5, in other words the baseplate 5. This may also equally be a reflector of an antenna, in particular a mobile communications antenna, in which case for example conventional mobile communications antennae are arranged on the opposite site of the base or reflector 5 and are likewise protected and covered by a radome (also not shown in FIG. 1).

It is also possible for a circuit board or support plate, on which the adjusting device is mounted, to be provided in the housing.

Figure 1:
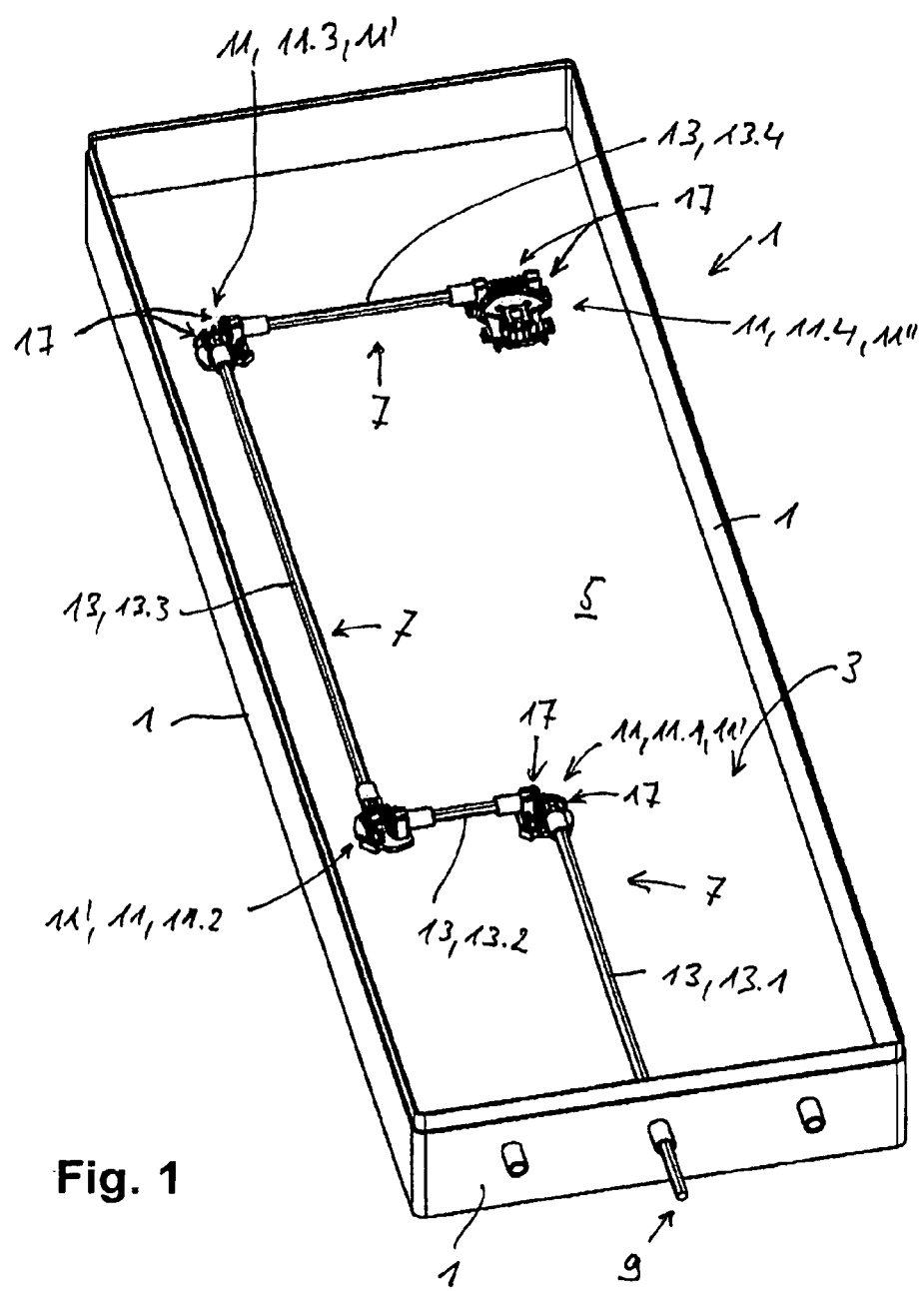
FIG. 1 is a three-dimensional view of a housing or the rear face of an antenna or mobile communications antenna with a removed rear-face cladding, illustrating a first embodiment of a modular adjusting device for RF devices.

FIG. 1 shows a drive train 7 which starts for example from a drive side 9 outside the housing, in other words is positioned outside the housing in the embodiment shown (this being irrelevant to the functionality of the invention), it being possible in this case for a motorised drive device or a manual actuation device to be attached to the drive train 7 outside the housing 1. In the case of a mobile communications antenna, for example an RET unit for adjusting phase shifters inside the antenna housing could be attached here outside the housing, and in the embodiment shown is arranged on the rear face (not visible in FIG. 1) of the baseplate or reflector 5.

In the embodiment shown, the drive train 7 shown extends from the drive side 9, using a shaft 13, via four transmission arrangements 11 (visible in FIG. 1) in the form of deflection transmissions to the rear face (not visible in FIG. 1) of the base or reflector 5.

Via the drivable shaft 13, in other words a first shaft portion 13.1, the drive transmission is deflected through 90° by way of the first transmission arrangement 11.1, for example in the form of an angular transmission or mitre gear transmission, causing a downstream shaft 13.2 to be driven, which in turn serves as an input shaft for a second downstream deflection transmission 11.2, which may likewise in turn be formed for example as an angular transmission. Subsequently, a third deflection transmission 11.3 is driven by a downstream third shaft strand 13.3, and a fourth transmission 11.4, also again in the form of a deflection transmission, in this case in the form of transmission gearing, is driven by a downstream fourth shaft strand 13.4.

Whereas the first three deflection transmissions may for example be formed as mitre gear transmissions, the fourth deflection transmission 11.4 is formed as a worm transmission.

It can also be seen from FIG. 1 that each of the aforementioned transmissions, in other words in particular deflection transmissions 11, respectively comprises two transmission members 17 which mesh with one another, in other words which are mutually engaged. As will further be seen from subsequent embodiments, each transmission 11 comprises at least two mutually engaged transmission members 17. In the transmissions 11.1 to 11.3, in other words the mitre gear transmissions 11', in the embodiment shown, mitre gears 129, 131, in other words identical mitre gears 129, 131, are used for the respectively mutually engaged transmission members 17, whereas in the fourth transmission, a worm gear transmission 11" is used, the two mutually engaged transmission members 17 of which consist of a worm 129' on the one hand and a worm gear 131' on the other hand, as is explained further in the following.

In the following, the further construction of the individual transmission arrangements is discussed.

Figure 2:
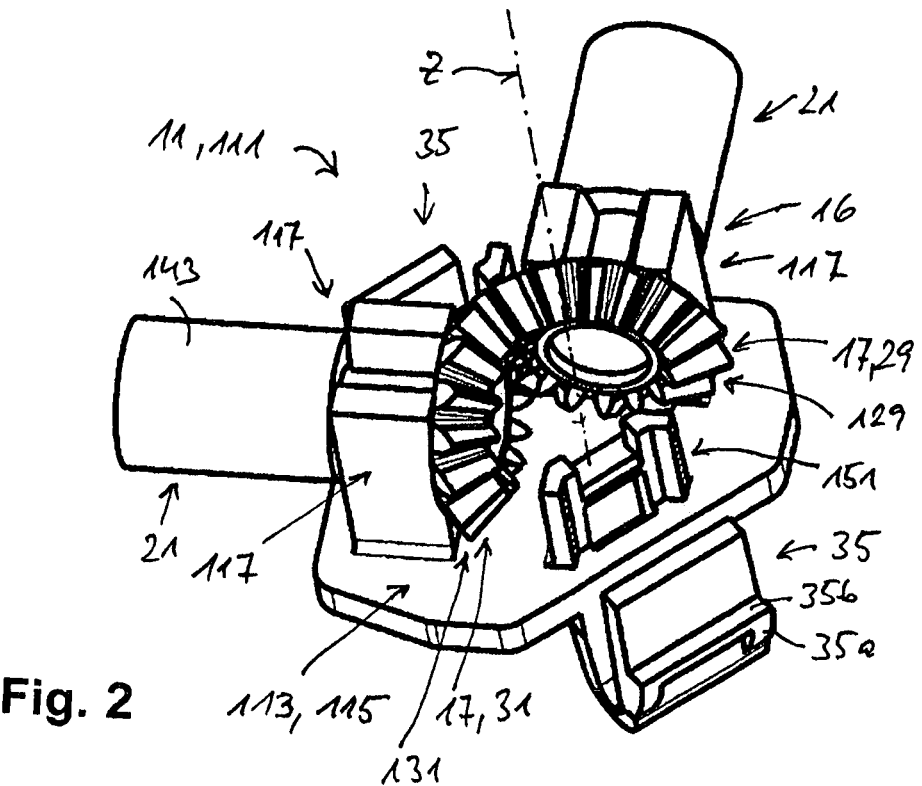
FIG. 2 is a three-dimensional view of a deflection transmission in the form of a mitre gear transmission.

FIG. 2 is a three-dimensional enlarged detail of a deflection transmission 11, which is in the form of a mitre gear transmission 11'.

For this purpose, the mitre gear transmission 11' comprises a transmission base module 113, which is also sometimes referred to as a transmission mounting plate 115 in the following.

Figure 3:
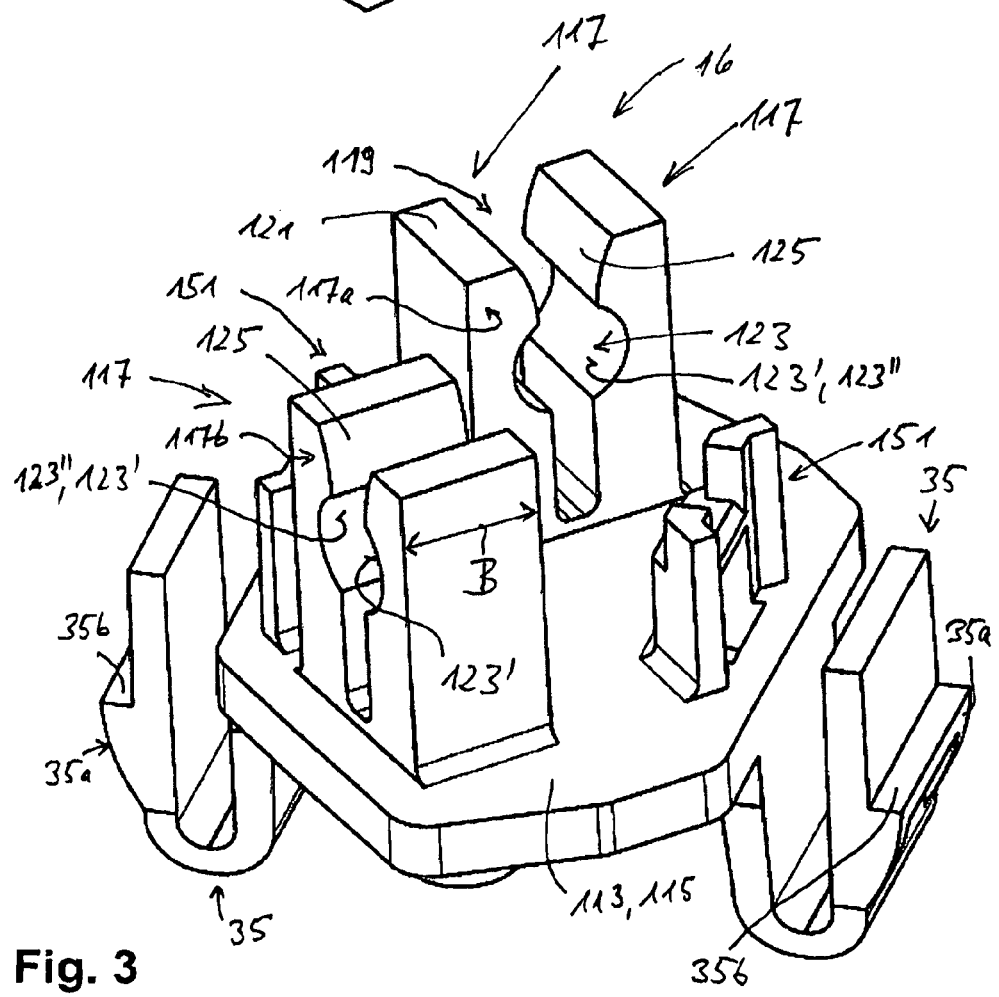
FIG. 3 shows a corresponding transmission base module for receiving the mitre gears shown in FIG. 2, but without mitre gears inserted.

In the embodiment shown, in each case two snap-in fingers or hooks 117 extending mutually in parallel at a lateral distance from one another are formed on the transmission mounting plate 115 in such a way that they are positioned so as to be offset by 90° in a plan view, and these can also be seen in an enlarged view in FIG. 3.

It can thus be seen that the two snap-in fingers 117 which form a snap-in and/or latch device 16 are mutually separated by a gap 119. For the outer finger ends 121, the snap-in fingers or hooks 117 comprise an approximately semi-cylindrical clearance 123, which is positioned so as to be offset with respect to the transmission mounting plate 115 and which is formed in each of the two snap-in fingers 117 by a concave clearance 123', said clearances facing one another. In a side view, this ultimately results in a cylindrical receiving space 123, into which the holding portions, described in greater detail in the following, of the mitre gears, can be snapped.

To make the snap-in process simpler, the mutually facing inner faces 125 of the respectively cooperating two snap-in fingers 117 are formed growing in a wedge shape or growing with convex contact faces in the direction of the cylindrical receiving space 123, and this simplifies the snap-in process, described in the following, of the transmission members. In other words, the gap 119 is formed so as to be conically tapered from the upper end 121 of the snap-in fingers or hooks 117 towards the mounting plate, in other words at least as far as the cylindrical receiving space 123, the adjacent receiving space 123 having a larger cross-sectional extension than the gap 119, in such a way that the hook-shaped snap-in fingers are thus formed with a type of undercut. To increase the resilience of the snap-in fingers or hooks 117, the gap 119 is extended further downwards towards the mounting plate 115 by way of the cylindrical clearance 123, and ends shortly before the plane of the mounting plate 115 in the embodiment shown.

In the embodiment shown in FIGS. 2 and 3, the snap-in hooks or clip hooks 117 thus formed are orientated in such a way that they are positioned so as to be offset by 90° about a central axis Z (which extends perpendicularly to the mounting plate 115, and thus perpendicularly to the plane of the base 5 of the housing 1 when assembled), since they serve to receive and mount mitre gears which are intended to form a 90° angular transmission.

Figure 4:
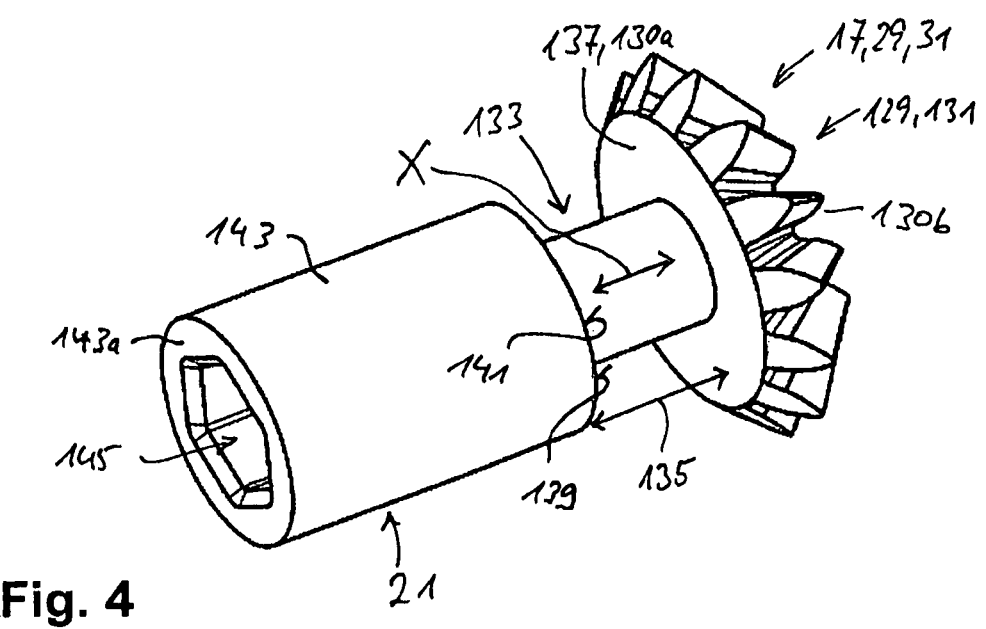
FIG. 4 is a three-dimensional view of a mitre gear as used in the above-described mitre gear transmissions.

FIG. 4 now shows one of the transmission members 17 used in FIG. 2, specifically a first transmission member 29, which thus cooperates with a second transmission member 31, the first and the second transmission member 29, 31 being formed identically in the embodiment under discussion.

The two transmission members 29, 31 are in the form of a first mitre gear 129 and a second mitre gear 131, specifically comprising a mounting shaft 133 which extends in the axial direction X of the transmission member 29, 31 thus formed. The mounting shaft 133 has a longitudinal mounting shaft extension 135 which is delimited by two axially offset stops 137, 139. The first stop 137 forms the rear face 130a of the mitre gear 129, 131, which in the embodiment shown is in the form of a radially extending planar face. On the front face thereof, the toothing 130b of the mitre gear 129 thus formed is formed.

The second stop 139, which is opposite the first stop 137 and spaced apart in the longitudinal mounting shaft extension direction X, is formed by the outwardly protruding annular shoulder 141, which encloses the mounting shaft 133 and on which the mounting shaft 133 transitions into a thicker shaft connection portion 143. This shaft connection portion 143 comprises, on the end face 143a thereof opposite the mitre gear 129, a plug-in opening 145, which comprises a non-round cross section, which is described in greater detail in the following, and of which a sufficient plug-in length extends in the shaft connection portion 143.

The diameter of the mounting shaft 133 is dimensioned in such a way that it approximately corresponds to the free distance, and thus to the diameter of the cylindrical receiving space 123 between the inner faces 125, which form the mounting faces 123', of the snap-in fingers 117, in other words the snap-in hooks 117.

Therefore, to assemble the mitre gear transmission, it is merely necessary to press in the mounting shaft portion 133 of a first and second transmission member 29, 31, in the form of the mitre gears 129, 131, which are identical in this embodiment, onto the gap 119, which becomes narrower towards the bottom, of the mutually adjacent snap-in fingers 117, in such a way that the resilient snap-in fingers 117 are bent away from one another until the mounting shaft 133 latches into the two semi-cylindrical clearances 123' on the two mutually adjacently arranged snap-in fingers 117, and the snap-in fingers 117 largely enclosing the mounting shaft 133 resiliently swing back into the initial position thereof which is shown in FIG. 3.

Subsequently, on the second snap-in finger arrangement, the second mitre gear 131, which is orientated so as to be offset in a 90° direction with respect to the first mitre gear, can be inserted into the associated snap-in device in the same way, the toothings 130b of the two mitre gears 129, 131 engaging in one another during the snap-in process of the second mitre gear, and thus being able to enter an operative connection and mesh in mutual engagement.

Since the axial length of the bearing shaft 133 is equal to or slightly larger than the axial width B or extension direction, which is parallel thereto, of the snap-in and/or latch device 16 comprising the snap-in fingers 117, the two stops 137, 139 of the mitre gears 129, 131 come to be positioned on the two opposite faces 117a, 117b of the snap-in device 16, in other words of the snap-in fingers and/or hooks 117. Said stops actually secure the respective mitre gear 129, 131 against axial displacement corresponding to the pre-selected play. As a result, the initially mounted mitre gear is held in an undetachable manner.

As can also be seen from FIGS. 2 and 3, two opposing latch fingers 35, which are formed so as to be U-shaped in a side view, are provided on the transmission base module 113, that is to say on the transmission mounting plate 115, and make it possible for the transmission base module 113 to be anchored to a base or a wall 5 before or after being equipped with the transmission members 29, 31, in that the transmission mounting plate 115 is set up at the correspondingly prepared points for example of a metal sheet, in such a way that the U-shaped latch fingers 147 can engage through rectangular slots in the base 5, be pivoted resiliently onto the actual plate 115 during this attachment process, in particular by the ramp portion 35a which extends in a wedge shape in the opposite insertion direction, until the step-shaped recess 35b has reached the underside of the base, baseplate or wall holding the transmission mounting plate 115, in such a way that the latch fingers 147 pivot outwards again, and the step-shaped recess 45b is positioned against the opposite side of the base or baseplate 5 and thus secures the transmission base module 113.

Figure 5:
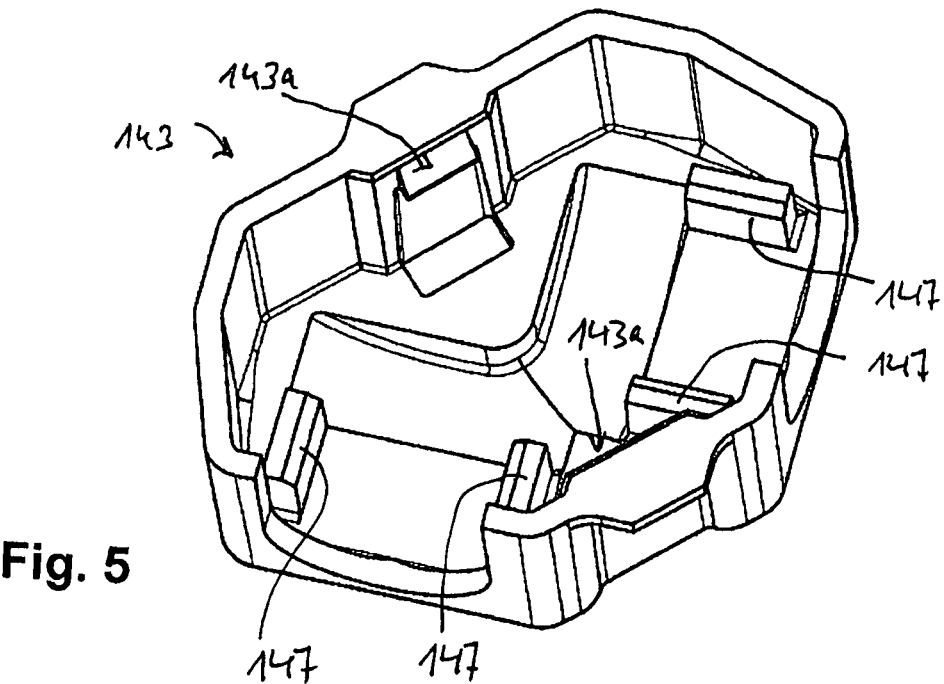
FIG. 5 is a view of a transmission housing cover from below.
Figure 6:
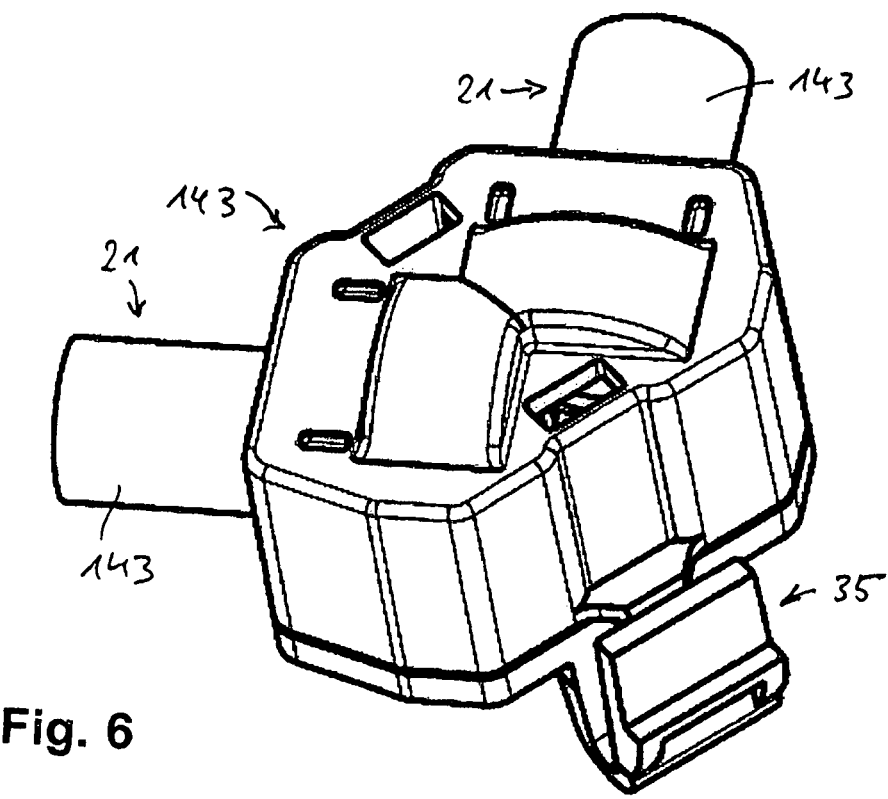
FIG. 6 shows the mitre gear transmission described with reference to FIGS. 1 to 5 with the transmission housing cover shown in FIG. 5 put on and locked.

Further, two raised latch blocks 151 are also formed at opposite points on the upper face of the transmission mounting plate 115, on which blocks a housing cover 143 (visible from the underside in FIG. 5) can be placed and fixed by latching, which subsequently latches onto the latch blocks 151 by way of corresponding latch devices 143a in the cover interior and is thus rigidly connected to the transmission base module 113, specifically so as to protectively enclose the transmission members 29, 31 located therein (FIG. 6).

Journals 147 are formed in the cover, and enclose and lock the snap-in hooks 117 of the transmission mounting plate 115 after the cover 143 is put on. This prevents the snap-in hooks 117 from deforming outwards as a result of high operating loads and no longer being able to mount the transmission members 29, 31 reliably. The deflection transmission 11 can transmit higher torques when the cover 143 is put on.

In this preassembled form, the entire transmission arrangement can be anchored to an anchor plate using the aforementioned latch fingers 35.

As stated previously, the transmission members 29, 31, in the embodiment shown, the two identically formed mitre gears 129, 131, comprise, at the end face thereof opposing the respective toothing 130a, the aforementioned plug-in opening 145, into which a corresponding shaft 13 of a matching diameter and contour can be inserted before or after a transmission member 29, 31 is fixed by snapping in. This also provides a plug-in coupling region 21.

Figure 7:
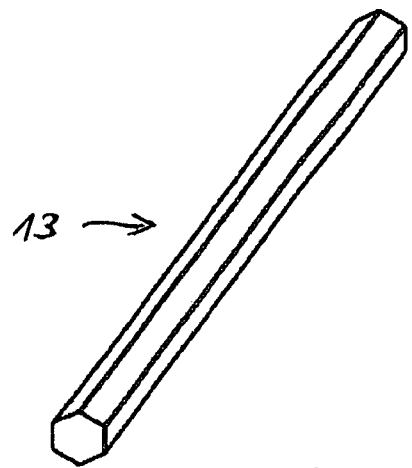
FIG. 7 is a three-dimensional view of a detail of a drive shaft.

To make a connection for conjoint rotation possible, in the embodiment shown, the respective shaft 13 is formed as an n-gon in diameter, in the embodiment shown as a regular hexagon (FIG. 7). The corresponding cross section of the plug-in opening 145 in the shaft connection portion 143, in other words in the plug-in coupling region 21 thus formed, is identical, in such a way that a corresponding shaft 13 can simply be cut to the appropriate length and subsequently, again without any tools, be connected to a transmission member 129 for conjoint rotation by insertion into the insertion opening 145.

Thus, using a construction of this type, the drive train shown in FIG. 1 can be produced without difficulty, in that for example the first deflection transmission 11.1 in the form of the mitre gear transmission 11' is produced without using any tools by pressing in mitre gears and for example subsequently a corresponding length of the first shaft 13.1 (leading outwards) and the second shaft 13.2 thereof are inserted onto the two mitre gears.

Subsequently, the second deflection transmission 11.2, which is formed identically in FIG. 1, can be produced in the form of the mitre gear transmission 11', in which case the shaft portion 13.2 which produces a connection to the first mitre gear transmission 11.1 can be inserted beforehand into the relevant plug-in opening 145 in the mitre gear 129 of the second transmission, before the entire second mitre gear transmission 11 is inserted into and anchored in corresponding openings in the base 5 by the transmission base module 113 thereof, in other words the transmission mounting plate 115 thereof, and the latch fingers 35 formed thereon. However, it is equally possible for example for the second shaft strand 13.2 to be connected to the two opposing mitre gears provided at the end, so as subsequently to clip the two mitre gears of this transmission strand into the two preassembled transmission base modules 113.

In FIG. 1, the next, third deflection transmission 11 in the form of an angular transmission 11' is subsequently also installed in a corresponding step. Since the shafts have a certain amount of resilience, it would be possible in this case too to install the second mitre gear completely, to connect the third shaft axle 13.3 to the outgoing mitre gear there by insertion into the plug-in opening 145, likewise to anchor the entire third transmission base module 113 to the baseplate by latching insertion, so as subsequently to press the mitre gear with the attached shaft into the transmission base module 113 from above only after said mitre gear is placed on the opposite end of the third shaft portion. Subsequently, the second mitre gear 131, in this case serving as an output mitre gear, can likewise be pressed in with or without a pre-inserted shaft, it being possible at the end to put on the housing cover.

Thus, in accordance with the embodiments described thus far, the described modular components of the modular adjusting device for RF devices therefore comprise a mitre gear transmission, which can consist of a mounting plate and preferably two identical mitre gears, the transmission base module 113, in other words the transmission mounting plate 115, comprising four snap-in hooks, specifically two pairs of snap-in hooks 117 for the mitre gear receiver in each case, in other words the mounting shaft 133, the sliding mounting faces 123" for the cooperating transmission members 17, in other words in the embodiment shown for the preferably identically formed transmission members 29, 31 in the form of the mitre gears 129, 131, in each case being formed on a pair of cooperating snap-in fingers or snap-in hooks 117. Two elbowed snap-in hooks 35 for fixing the transmission module 113, in other words the transmission mounting plate 115, to a wall or base, for example to a reflector of an antenna, are further provided.

As stated, each transmission member, in other words each mitre gear, comprises a mounting shaft 133 and two axial stops 137, 139, which cooperate with the delimitations or stops 117a, 117b, which are correspondingly offset in an axial direction, of the snap-in hooks 117 and hold the relevant transmission members 17, in other words 29 and 31 respectively, such that they are undisplaceable or only displaceable with slight play in the axial direction. In this context, the snap-in hooks for the mitre gear receiver are dimensioned in such a way that they also do not fail during torque transmission.

As stated, it is also found to be highly advantageous that both the first and the second transmission member 29, 31, thus in particular the mitre gears 129, 131, can be pressed into the bearing block 115 by hand, without any tools, in succession or simultaneously. In this context, the mitre gear transmissions may be pre-assembled as an assembly and subsequently mounted on a support plate or a base 5 by hand, or vice versa. Slight angle errors of the shafts, for example up to 5°, at least up to 4°, 3°, 2° or 1°, are compensated without difficulty by the snap-in hooks 117, especially if all of the components used consist of plastics material, in other words in particular not of metal or metal connections (optionally consisting of or comprising glass-fibre-reinforced plastics material, as is discussed further in the following).

The described embodiment has been explained on the basis of straight-toothed, identically formed mitre gears. However, instead of the straight-toothed mitre gears, obliquely toothed mitre gears or curved-toothed mitre gears could equally also be used. In this case, especially if a transmission ratio is desired, it would also be possible for example for one mitre gear transmission to be provided with a comparable construction, specifically with a pinion which is generally dimensioned so as to be smaller, which cooperates with a ring gear which is dimensioned so as to be larger. In all cases, a comparable snap-in and latch device for anchoring, mounting and axially fixing a corresponding transmission member can be provided. Lastly, even the two respectively cooperating transmission members 17 may be formed in the manner of mutually engaging crown gears, specifically so as to form a crown gear transmission, in other words a special form of a deflection transmission. As is known, in a crown gear transmission, one transmission part is configured in such a way that teeth are formed on one face of the transmission gear and give the relevant transmission gear the appearance of a crown.

In the following, the aforementioned shaft shown by way of example in FIG. 7 is discussed further.

The shaft 13 which is used or the shaft portions 13.1 to 13.4 may constitute a component which may consist of a glass-fibre-reinforced plastics material (for example having a glass content greater than 50%, in particular greater than 60%, 70% and in particular greater than 80%) of hexagonal cross section. For this shaft to have a high torsional rigidity, it may have a glass fabric meshwork, which provides the rotational strength, in the outer shaft material region, in addition to the glass-fibre-reinforced components, which are provided extending in the axial direction for example in the interior, in other words in the central region, of the shaft 11. In other words, the unidirectional fibres are arranged in the centre and the fabric fibres which bring about the torsional rigidity are arranged outside. Thus, as a result of this specific construction, the shaft also has a good resilience, but only a slight relaxation tendency.

This makes it possible for the shaft 13 also to be able to be bent to a certain extent, so as to use it as a flexible shaft. Thus, certain bending radii can be implemented using this shaft. This also makes it possible to compensate transmission elements which are not positioned so as to be flush or to compensate height differences.

Since the above-described transmission members 17, as well as those described in the following, and in particular also the shafts and shaft portions, consist of plastics material or glass-fibre-reinforced plastics material, this results overall in an intermodulation-proof construction not only as regards the flexible shaft 13, but also as regards the transmission arrangements 11 used.

Since the transmission members, in other words the aforementioned mitre gears, as well as the transmission members mentioned in the following in the form of worms or worm gears, have plug-in openings 145 which are dimensioned so as to be slightly larger than the outer contour or external diameter of the shaft 13, the shafts can be inserted into these plug-in receiving openings 145 without difficulty so as to ensure reliable torque transmission by way of the non-round external shape, in this case the hexagonal shape.

This also makes possible cost-effective manufacture of the shaft 13 as a continuous material. When a drive train of this type is used, the necessary shafts and shaft portions merely have to be cut to the correct length. It is not necessary to use additional shaping elements on the shaft ends or couplings. The insertion depth of the shafts and shaft portions 11 into the plug-in receivers 145 of the transmission members 17, in particular the aforementioned mitre gears and the transmission worms or worm gears described in the following, can be dimensioned in such a way that reliable torque transmission can take place even in the event of extreme temperatures and the resulting different length extensions. This is because relative changes in length of the shafts and shaft portions with respect to the baseplate 5 are compensated by the overlap region in the insertion end 145 of the respective transmission members.

Figure 8:
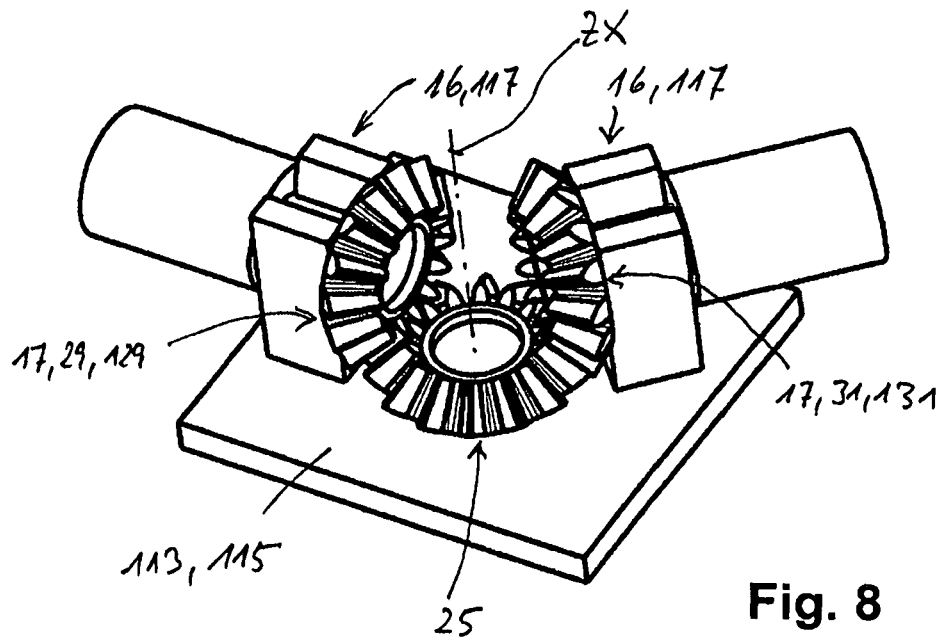
FIG. 8 shows a modified embodiment having an angular orientation differing by 90° between the drive shaft and driven shaft of a mitre gear transmission.

FIG. 8 only schematically shows that it is also possible to use transmission mounting plates 115 in which the corresponding snap-in and latch devices 16 are orientated with respect to one another at any desired predeterminable angle rather than at a 90° angle.

As is known per se in transmission arrangements of this type, the input-side and output-side mitre gear may be arranged in any desired angular orientation with respect to one another in a plan view, an intermediate mitre gear 25 which is perpendicular to the input and output shaft being used for the rotational connection, and it being possible for example for the shaft of said intermediate mitre gear to be mounted in a baseplate in a corresponding hole clearance (it being possible for said mitre gear to be fixed to the rear face of the mounting plate 115 shown in FIG. 8, for example including by a snap-in or latch connection).

Purely for the sake of completeness, it is noted that for example the second snap-in or latch device 16 can also be mounted by means of an arrangement which is pivotable concentrically with the intermediate mitre gear 25 about the intermediate axis ZX (which corresponds to the central axis of rotation of the intermediate mitre gear 25) so as to fix the second transmission member 31 in the form of the second mitre gear 131. It is also advantageous to form a plurality of snap-in devices for the driven mitre gear, of which one can be selected, integrally on the transmission mounting plate.

In this construction, the provided 90° mitre gears may be used to implement any desired output angle. Merely a new transmission mounting plate is required. However, no further mitre gears having a different axis angle are required for the modular system. This reduces the variety of parts and leads to enormous cost advantages, since injection-moulding tools for transmission mounting plates are much more cost-effective than injection-moulding tools for mitre gear toothings.

Figure 9:
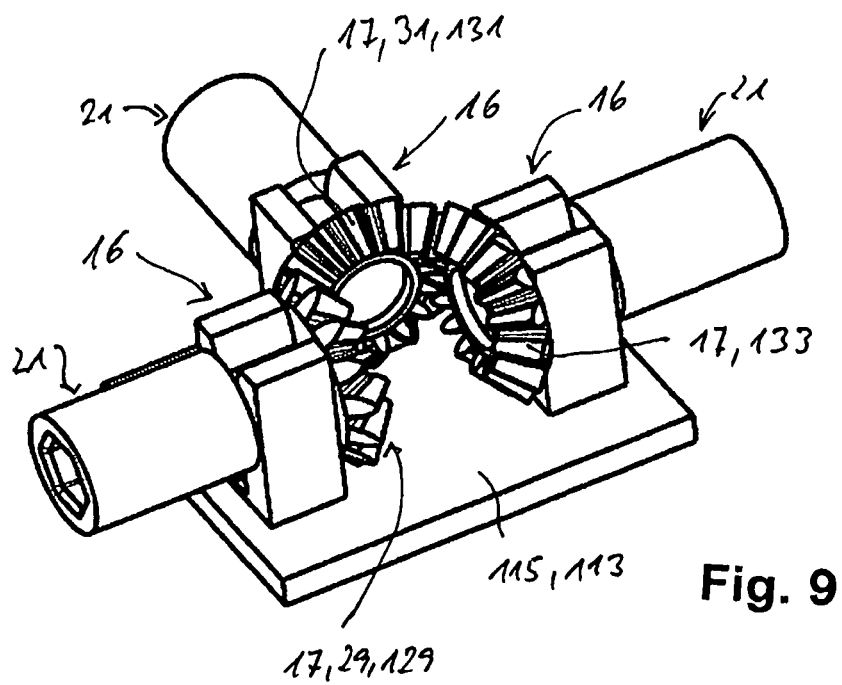
FIG. 9 shows a further embodiment, for reversing the direction of rotation and/or for providing power branching.

FIG. 9 shows how a rotation direction reversal device using the described transmission members 29, for example in the form of the first and second mitre gear 129, 131, may appear.

In this case, FIG. 9 also shows how a drive train branch comprising the transmission members which are formed according to the invention and the associated transmission base module constructions 113 may appear.

In the variant according to FIG. 9, for example two 90°-angle mitre gear transmissions as described with reference to the previous embodiments are assembled, identical mitre gears being used, the axial stops of the mounting shafts 133 of which are pressed into the corresponding snap-in devices 16. The angular toothings of the first and second mitre gear 129, 131 thus mesh together, as do the angular toothings of the second and third mitre gear 131, 133. If for example a corresponding rotational movement is introduced via the mitre gear 129 on the left in FIG. 9 via a shaft 13 (not shown in greater detail here), the mitre gear 131 shown in the centre in FIG. 9 along with the associated shaft which can be inserted therein and the mitre gear 133 on the right in FIG. 9 are thereby forcibly set into rotation, and thereby so too are the shaft portions 13 (not shown in greater detail in FIG. 9) which are inserted into the plug-in coupling region 21 thereof.

Figure 10:
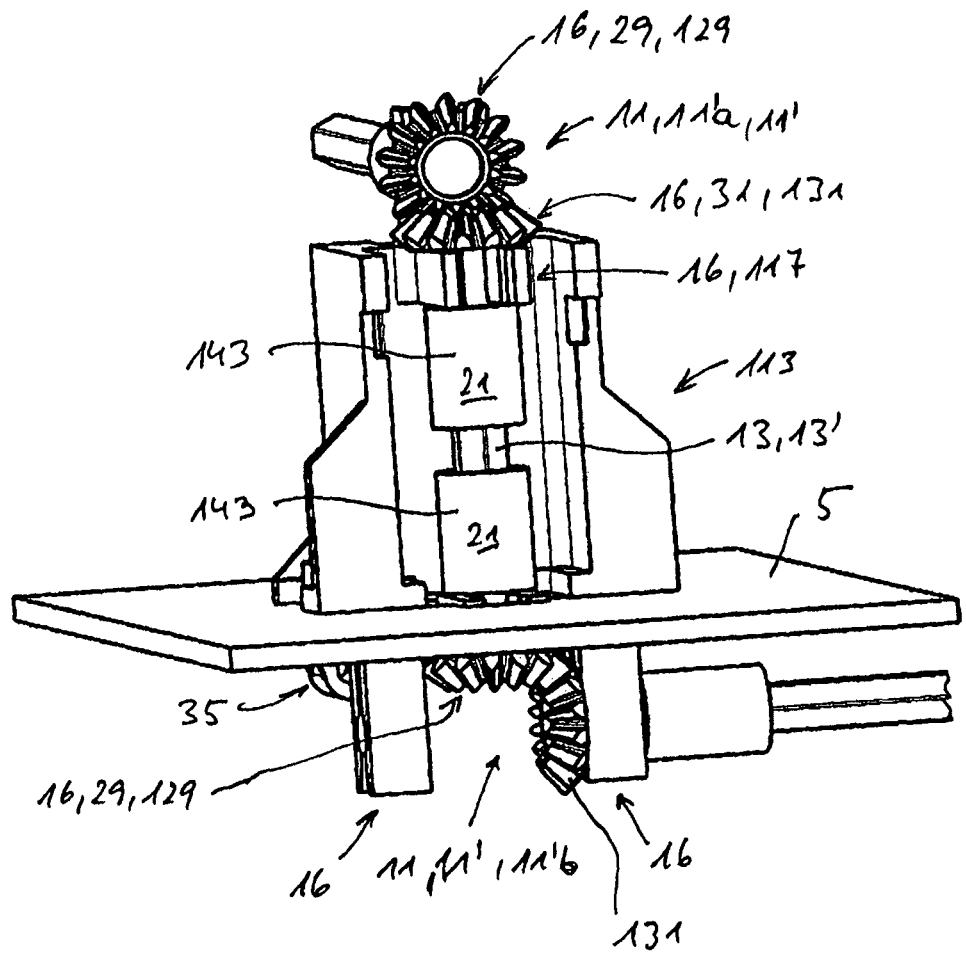
FIG. 10 is a three-dimensional view of a modified embodiment, in which a drive train passes through an opening in a wall, baseplate etc.

FIG. 10 shows a modified embodiment for a transmission base module 113, such as may be used in particular if a drive connection is to be made from one side of a baseplate of a reflector to the opposite side.

Ultimately, FIG. 10 simply shows two angular transmissions arranged at a small distance from one another and thus in succession, in other words mitre gear transmissions 11' in succession.

The upper mitre gear 11'a in FIG. 10 thus comprises two mitre gears 129, 131, in an operative connection with one another as described previously, the mounting and anchoring for the first mitre gear 129 not being shown in greater detail in FIG. 10. The second mitre gear 131 which meshes therewith is mounted so as to be axially undisplaceable but freely rotatable with respect to one of the aforementioned snap-in and latch devices 16 using what are known as snap-in fingers 117.

A second mitre gear transmission arrangement 11', in other words 11'b, is formed on the lower face of the baseplate, the mitre gear 129, which rotates about the vertical axis and the toothing of which faces downwards, likewise comprising the aforementioned shaft connection portion 143 so as to form a plug-in coupling region 21, in such a way that the two plug-in coupling regions of the two mitre gear transmissions 11' are arranged in a directly adjacent position and interconnected only by a comparatively short intermediate shaft 13'.

Thus, in other words, the identically formed mitre gears are used as described above, merely the transmission base module 113 being modified and formed specifically so as to fix and receive the two mitre gear transmissions on top of one another.

Figure 11:
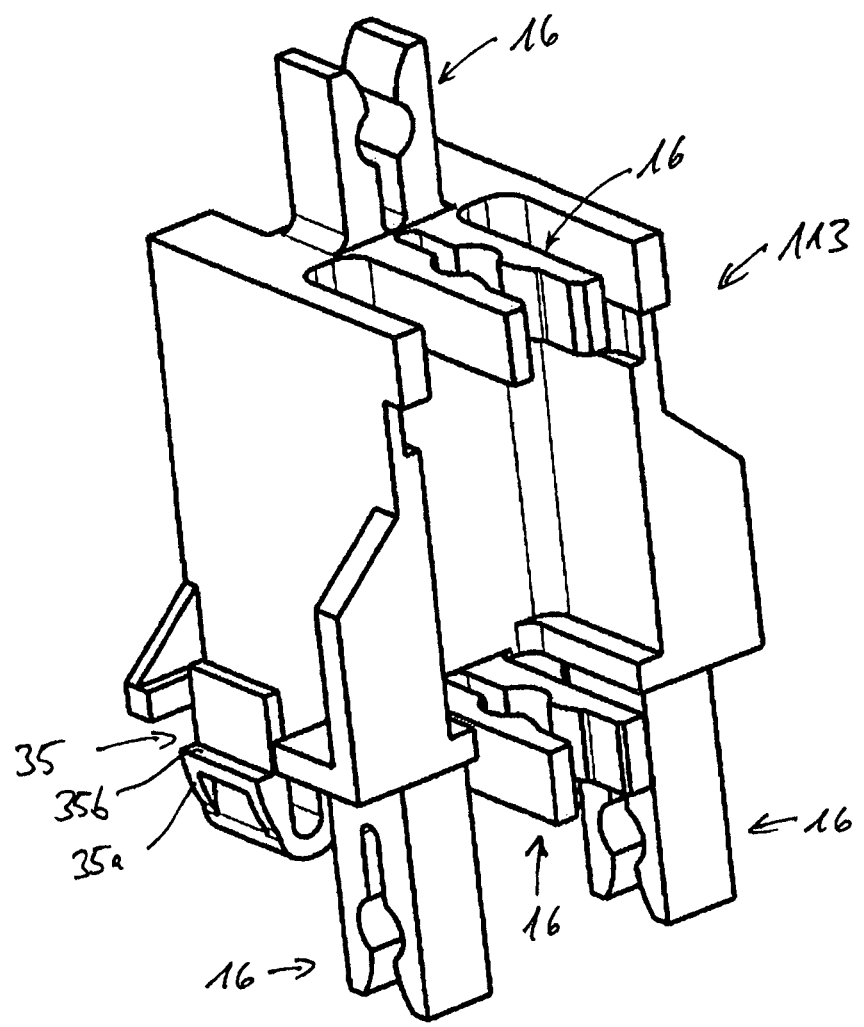
FIG. 11 shows the transmission base module shown in FIG. 10 alone without inserted mitre gears.

The entire transmission base module arrangement 113 according to FIG. 11 is thus likewise in turn held by corresponding latch fingers 35 inserted through clearances in the base and the baseplate 5.

Thus, this portion of the drive arrangement can be mounted without any tools.

FIG. 11 shows the transmission base module 113 without the installed mitre gears.

From FIGS. 10 and 11, it can further be seen that two snap-in or latch devices 16, which are positioned so as to be offset in parallel with the base plate 5, are provided for example on the underside of a base, a wall or a baseplate 5, in other words in the opening provided there through which the drive train 7 extends. In the embodiment according to FIG. 10, merely the snap-in and latch device 16 on the right is required, since in this case the drive train extends on the right via a mitre gear 131 inserted there. If required, however, this mitre gear 131 could also equally be anchored to the snap-in and latch device 16 on the left in FIG. 10, so as to mesh with the mitre gear 129 which is located directly below the baseplate 5. In this case, the drive train to be established below the baseplate 5 could be diverted to the left, unlike in FIG. 10.

Further, it is also possible to use the two lower snap-in devices 16 simultaneously and thus to transmit the torque to two drive trains.

Figure 12:
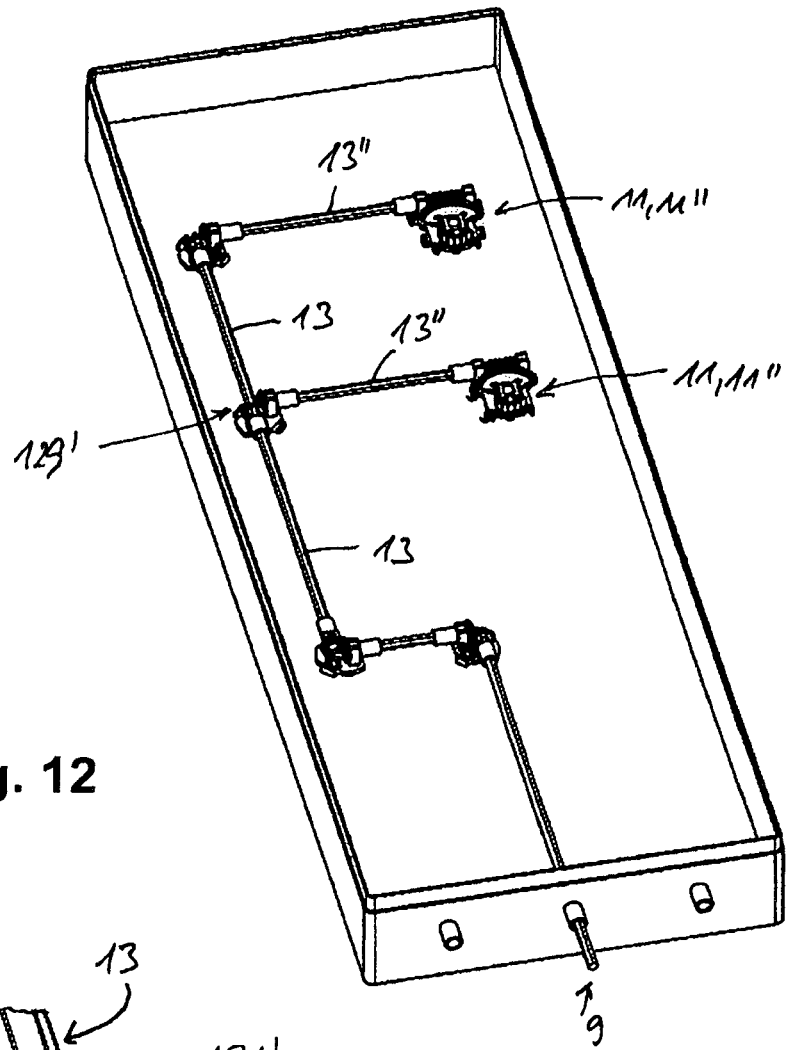
FIG. 12 shows a modified embodiment with drive trains branched in parallel.
Figure 13:
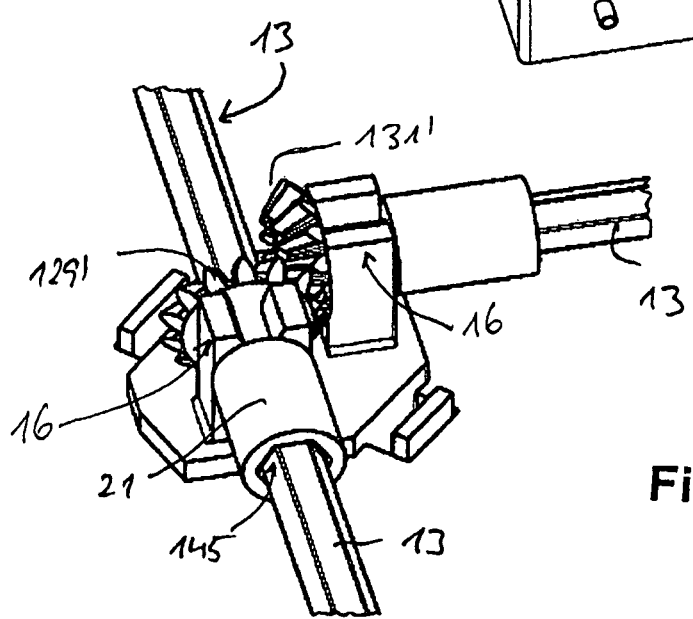
FIG. 13 is an enlarged detail from FIG. 12.
Figure 14:
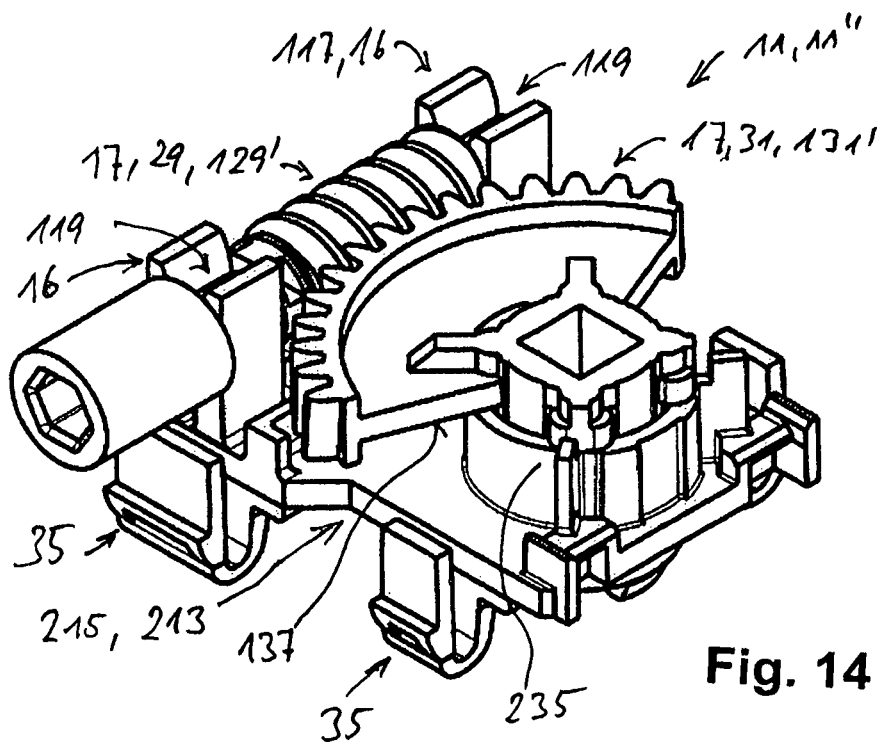
FIG. 14 is a three-dimensional view of a modified embodiment of a worm gear transmission.

FIGS. 12 and 13 show an embodiment modified in that in this case, in the third deflection or angular transmission 11, a mitre gear is used of which the plug-in opening 145 is formed as a through-opening rather than a blind opening. Thus, in this case, the associated shaft 13 which is formed with a non-round cross section (for example in the manner of a regular hexagon) can be pushed through this mitre gear 129'. This also ensures forced parallel actuation of the drive side 9, in which the two driven shafts 13" are forcibly driven in the same direction of rotation at the same rotational speed using an identical toothing overall for all mitre gears used. Lastly, the attachable housing lid should further comprise a further hole or opening through which the pushed-through shaft 13 can exit again.

Purely for the sake of completeness, it is noted that the driven mitre gear 129' shown in FIG. 13 may also comprise two plug-in coupling regions 21 which are mutually separated in the axial direction, which thus each comprise two plug-in openings 145 extending inwards in the axial direction, into each of which a shaft 13 can be inserted into the associated mitre gear 129' from both opposite, axially offset end faces. In this case, the shaft 13 would thus not pass through the relevant mitre gear in a single piece.

FIG. 1 has already shown that the final transmission 11 therein was in the form of a screw roller transmission 11", in other words in the form of a worm transmission 11", and not in the form of a deflection transmission 11'.

As is known, a worm transmission comprises a worm which may be provided with one or more screw threads and with an obliquely toothed gear which meshes with the worm. The axes of the two transmission members are often likewise orientated so as to be offset by 90°. Worm transmissions of this type are suitable in particular where higher transmission ratios are desirable.

Figure 15:
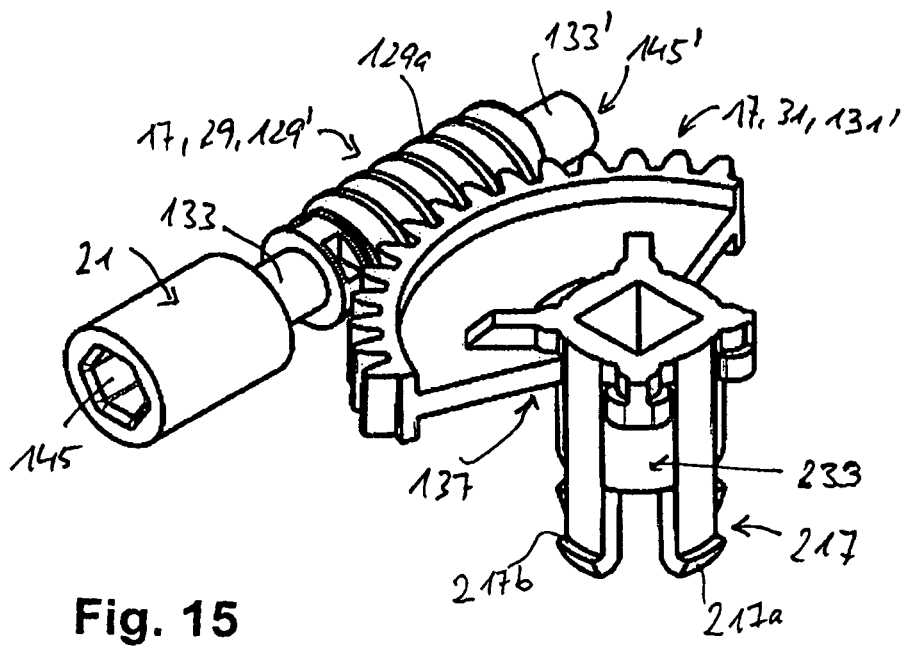
FIG. 15 shows only the worm and the worm gear of the worm gear transmission shown in FIG. 14.
Figure 16:
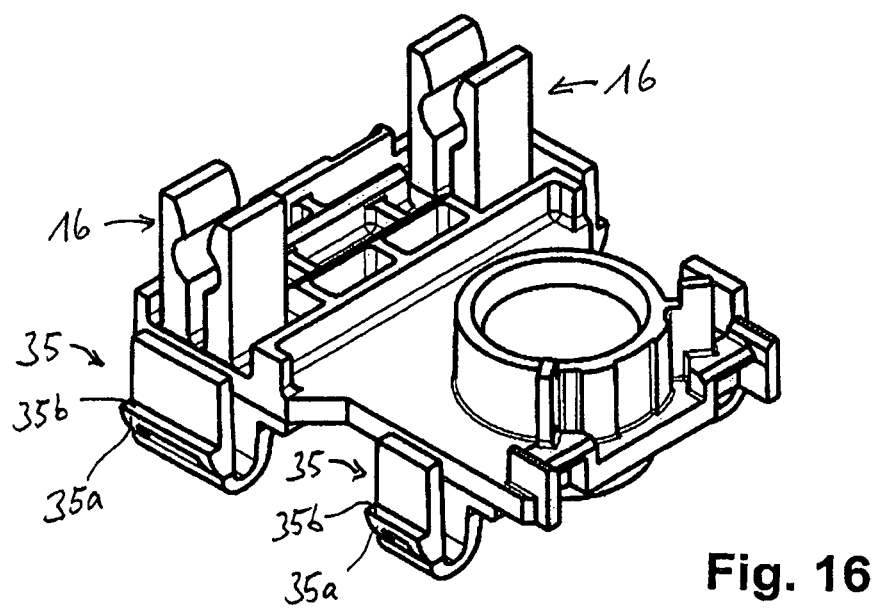
FIG. 16 is a three-dimensional drawing of the transmission base module as used in the worm gear transmission according to FIGS. 14 and 15.

FIGS. 14 to 17 show this worm transmission 11" along with the two transmission members 29, 31, one transmission member 29, as stated, being in the form of the worm 129', and the second transmission member 31 being in the form of a worm gear 131'. If the worm gear 131' does not have to complete a full rotation about the axis of rotation thereof, it may also be formed as a partial wheel or worm gear segment, as is shown in FIGS. 15 and 16.

In this embodiment too, the first transmission member 29 in the form of the transmission worm 129' is formed in such a way that said worm in turn comprises a first mounting shaft 133, the axial length of which in turn corresponds to the width B of the associated snap-in device 16 comprising the snap-in fingers 117, in such a way that in this case the mounting shaft 133 can in turn be inserted into the cylindrical receiving space 123 of the snap-in device 16, which is formed identically in this regard.

Following on from the worm threads 129a at the opposite end, a remaining shaft stump or shaft stub 133' can be latched, in other words snapped, into a snap-in device 16 which is formed identically in this regard, using two snap-in fingers 117. A second axial fixing, which secures the worm thus formed against axial displacement, is not required. It is sufficient for the two corresponding stops 137, 139 in the first embodiment using mitre gears, to be provided at a point on the first transmission member 29, in other words the transmission worm 129'.

The second transmission member 31 in the form of the worm gear 131', which meshes therewith, likewise comprises a mounting shaft 233, which is delimited in the axial extension thereof by the rear face of the worm gear 131', which forms the first stop 137. Snap-in fingers 217 are formed so as to be offset at an axial distance therefrom, said fingers extending in an axial direction and it being possible by way thereof to insert the worm gear through a corresponding cylindrical clearance into the transmission base module 213 in the manner of a transmission mounting plate 215, until the snap-in device, which protrudes in an axial direction and is provided with latch journals protruding away radially outwards, engages with the corresponding, hollow cylindrical mounting clearance in the transmission base module 213 from behind and thus secures the shaft 233 of the worm gear 131'.

In other words, this transmission or deflection transmission 11" can also be assembled entirely without the use of tools.

In this embodiment too, the worm 129' is provided, on at least one connection face, with an axially orientated plug-in opening 145, which serves as a plug-in coupling region 21 into which a corresponding shaft 13, in other words a shaft end, can be inserted. A corresponding plug-in opening 145' is also formed on the end face of the worm gear, so as likewise in turn to be able to insert the end of a corresponding shaft 13 or of a shaft of the component to be adjusted.

As stated, the actual worm 129', as a first transmission member 29, is secured on two snap-in devices 16 which are offset in the axial longitudinal direction of the worm. The axial distance between the two snap-in devices 16 serves to receive the threads 129a of the actual worm 129'. The construction is such that the worm 129 shown in the drawings can also be inserted into the two snap-in devices 16 when rotated through 180°.

In this embodiment, the aforementioned snap-in fingers or latch hooks 217 protrude past the actual mounting shaft 233 in the axial direction thereof, and are formed with faces 217a which are ramped in a wedge shape and with undercuts 217b, in such a way that they engage with a hollow cylindrical receiver 235 (see FIG. 14), which is rigidly connected to the base and the bearing block 213, 215, from behind on the underside thereof, by means of which the worm gear 131' is held. The transmission base module 213 shown in FIGS. 15 and 16 likewise in turn additionally comprises latch devices or latch fingers 35, which are preferably U-shaped in cross section, in the embodiment shown two pairs of snap-in fingers or latch devices 35 of this type in each case, so as in turn to be able to anchor the transmission base module 213 in a corresponding clearance in a base or a wall 5.

The snap-in hooks 217 for axially securing the worm gear 131' in position may also be formed on the transmission base module 213. In this case, the worm gear merely has to have a corresponding peripheral groove in which snap-in hooks 217 can engage.

Figure 17:
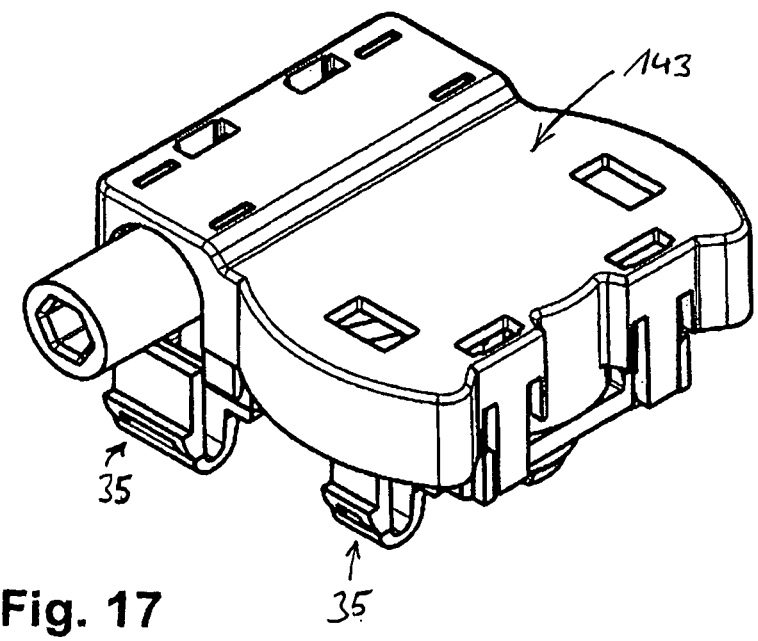

Lastly, FIG. 17 likewise again shows that, in the worm transmission too, a housing cover 143 can be releasably placed on and latched to the transmission base module 213 (for example in the form of the transmission mounting plate 215). The functional formation of this housing cover 143, which is shown in FIG. 17, is comparable with the housing cover 143 shown in FIGS. 6 and 7, which in that embodiment was described for covering a mitre gear transmission 11' and not for covering a worm gear transmission 11".

In conclusion, as regards the deflection transmission 11 in the form of the worm transmission 11", it can be established that a preferred embodiment for example likewise comprises a transmission base module 213, optionally in the form of a transmission mounting plate 215, on which preferably a plurality of, for example eight, snap-in fingers or snap-in hooks are formed, specifically for example four snap-in hooks (specifically two pairs of snap-in hooks) for fixing and holding the worm receiver, two sliding mounting faces, opposing one another in pairs and formed on the snap-in hooks, for the worm being formed in each case. Further, for example four additional elbowed snap-in hooks are provided for fixing the transmission base module 213, in other words the transmission mounting plate 215, on or in a support plate, a circuit board, a wall, a base etc. Likewise, as stated, one, two or for example three or preferably four snap-in hooks may be formed on the worm gear itself, so as to position the worm gear freely rotatably in the bearing block in a correspondingly hollow cylindrical clearance, but secure it against axial displacement, removal or detachment. In the described embodiment, the aforementioned worm can preferably also be assembled when rotated through 180°, in such a way that torque transmission from the other side is still possible.

The overall portable construction of a drive train is primarily distinguished in that the individual parts can be assembled and disassembled without tools, and the entire arrangement is thus releasable in this regard. Merely the individual drive trains have to be provided in the appropriate length, for example by cutting or sawing corresponding shaft portions. This results in an entirely modular system for implementing a wide range of preferably intermodulation-proof drive trains for an adjusting device, in particular for RF devices. Thus, in this construction kit system, components arranged in a device can be adjusted as desired using mitre gear transmissions suitable for repeated use, worm gear transmissions etc., as well as different lengths of shafts.

Different variants of the described embodiments are also conceivable.

It is further possible for example for a protective covering in the form of a cover (see FIGS. 7 and 17) to be provided for each of the different transmission stages. As a result, the respective transmission arrangement is protected against soiling and positional securing is provided for the transmission elements and for the snap-in hooks for example on a reflector. Further, smaller clearances may also be formed in the corresponding cover and/or in the transmission mounting plate, for example so as to release the latch devices to open the cover using at least one tool (screwdriver).

It is likewise possible in the described embodiments for the torque to be introduced through a wall, for example a reflector plate, for example by means of a twin-form mitre gear stage. In this case, a single-piece bearing block, in other words a single-piece transmission base module, may preferably be used.

In this context, the described embodiments have further shown that two or even more components can also be driven simultaneously by corresponding branches. Likewise, angles other than a 90° angular orientation can be implemented using special mounting plates. Even mounting plates, in other words transmission mounting plates 115, by means of which continuous angle setting and angle adjustment can be implemented for the driven shaft are possible.

The invention claimed is:

1. Adjusting device for RF devices comprising:
    at least one drive train having at least one transmission and having at least one shaft or shaft portion,
    the at least one transmission comprising at least a first transmission member and a second transmission member, which are in an operative connection with one another or mesh with one another,
    the first and second transmission members being held in or on at least one transmission base module,
    the at least one transmission base module comprising an associated first snap-in and/or latch device for the first transmission member,
    the first transmission member being held and secured by the associated first snap-in and/or latch device by snapping in, and
    the first snap-in and/or latch device being structured in such a way that the first transmission member is held so as to be stop-delimited in an axial direction,
    the at least one transmission base module further comprising an associated second snap-in and/or latch device for the second transmission member,
    the at least one second transmission member being held and secured by the associated second snap-in and/or latch device by snapping in,
    the second snap-in and/or latch device being structured in such a way that the second transmission member is held so as to be stop-delimited in the axial direction, and
    the first and the second transmission members each comprising a plug-in coupling region, in which the at least one shaft or shaft portion is connected for conjoint rotation by way of a plug-in connection.

2. Adjusting device according to claim 1, wherein the at least one transmission consists of one of a deflection transmission, a mitre gear transmission and a worm gear transmission.

3. Adjusting device according to claim 1, wherein the at least one transmission comprises a deflection transmission in the form of a transmission gearing.

4. Adjusting device according to claim 1, wherein, on the at least one transmission base module or on the at least one transmission base module in the form of a transmission mounting plate, at least one latch device is disposed or two offset latch devices are disposed, in which a transmission housing cover is releasably latched, which covers the transmission and by way of which the first and second transmission members in an operative connection with one another are covered and protected, and the first and second snap-in devices are secured in position.

5. Adjusting device according to claim 1, wherein the at least one shaft or shaft portion consist of plastics material or of glass-fiber-reinforced plastics material, the glass fiber content of the at least one shaft or the shaft portion being more than 50%.

6. Adjusting device according to claim 5, wherein the at least one shaft or the shaft portion comprises predominantly unidirectional fibers in an axially extending central region and comprises a glass fabric meshwork in a peripheral casing region, which constitutes less than 25% of the diameter of the at least one shaft or shaft portion.

7. Adjusting device according to claim 1, wherein the at least one drive train is structured so as to be intermodulation-proof and the transmission base module and/or the first and second transmission members and/or the at least one shaft or shaft portion consist of plastics material and/or comprise plastics material or consist of plastics material formed to be metal-free.

8. Adjusting device according to claim 1, wherein the a plug-in coupling region of each of the first and second transmission members, into which the at least one shaft or shaft portion or an end of the at least one shaft or shaft portion can be inserted and held axially displaceably, brings about a connection for conjoint rotation between the at least one shaft or shaft portion and a said transmission member connected thereto, the cross section of the at least one shaft or the shaft portion and the plug-in connection of the plug-in coupling region having a non-round cross-sectional shape or an n-gon cross-sectional shape or an n-gon cross-sectional shape in the form of a regular n-gon, n being a natural number between 2 and 11.

9. Adjusting device according to claim 1, wherein the at least one transmission base module comprises at least one mutually offset latch device structured to latch the transmission base module in a base, a wall or a plate by inserting the offset latch device into corresponding clearances in the base, the wall or the plate.

10. Adjusting device according to claim 1, wherein the first snap-in and/or latch device comprises snap-in fingers or snap-in hooks, which cooperate in pairs and are raised up from the at least one transmission base module to form a separating gap, a cylindrical or cylinder-like clearance, which projects beyond a width of the separating gap and in which a mounting shaft which is formed on the first transmission member can latch, being formed in a region of the separating gap.

11. Adjusting device according to claim 10, wherein the mounting shaft has an axial length that is delimited by two stops which are offset in the axial direction by a distance, the axial length of the mounting shaft corresponding to a width of the snap-in fingers and/or snap-in hooks of the first snap-in device or being slightly greater than the width of the snap-in fingers and/or snap-in hooks.

12. Adjusting device according to claim 11, wherein the distance between the two stops in the axial direction is less than 5% longer than the width of the snap-in fingers and/or snap-in hooks.

13. Adjusting device according to claim 11, wherein one of the two stops is formed by a rear face of a mitre gear and an opposing one of the two stops is formed by a shoulder which protrudes radially past the mounting shaft and via which the mounting shaft transitions into the plug-in coupling region.

14. Adjusting device according to claim 1, wherein the at least one transmission is in the form of a mitre gear transmission and comprises two identical, mutually meshing mitre gears or a pinion and a ring gear meshing therewith or mutually meshing crown gears.

15. Adjusting device according to claim 1, wherein the first and second transmission members are in a drive connection with a third transmission member interposed in an angular connection at an angle other than 90°.

16. Adjusting device according to claim 1, further comprising at least three mitre gears each held on the transmission base module the first snap-in and/or latch device, the at least three mitre gears each being arranged so as to be mutually offset by 90° in a plan view, in such a way that the first mitre gear meshes with the second mitre gear and the second mitre gear meshes with the third mitre gear, at least the first and the third mitre gear being connected to the at least one shaft or shaft portion for conjoint rotation.

17. Adjusting device according to claim 1, wherein the transmission base module is formed in such a way that a plurality of drive output angles are implemented by providing a plurality of snap-in devices for a driven gear wheel or a position of the first snap-in and/or latch device for the driven gear wheel is adjustable in a continuous manner.

18. Adjusting device according to claim 1, wherein the transmission base module is formed in such a way that it is anchorable in an opening in a base, a wall or a plate portion, and the drive train passes through a plane of the base, wall or plate, and the at least one transmission comprises at least two deflection transmissions anchored in the transmission base module by the first snap-in and/or latch device.

19. Adjusting device according to claim 1, wherein the at least one transmission comprises a worm gear transmission comprising a worm as the first transmission member and a worm gear in an operative connection therewith as the second transmission member, the worm being held by two snap-in and latch connections, at one mounting shaft in each case formed upstream and downstream from the worm.

20. Adjusting device according to claim 19, wherein the worm is insertable into the first and second snap-in and/or latch devices when rotated through 180°.

21. Adjusting device according to claim 20, wherein the worm is threaded and is provided, at each of two opposing ends thereof which are offset in the axial direction, with a plug-in clearance so as to form the plug-in coupling region, in such a way that the shaft or shaft portion can be inserted at the opposing ends of the worm.

22. Adjusting device according to claim 20, wherein the first snap-in and/or latch device, by which the worm gear or a ring gear is held so as to be rotatable and axially stop-delimited in a hollow cylindrical receiver of the transmission base module, is formed on the worm gear or ring gear in the axial direction of an associated shaft.

23. Adjusting device according to claim 1, wherein the first and second transmission members each have plug-in clearances, the plug-in clearances of the first and second transmission members being arranged so as to be coaxial or flush and the at least one shaft or shaft portion is positioned in parallel with or perpendicularly to the base plate and to housing walls.

24. Adjusting device according to claim 23, wherein the plug-in clearances of the first and second transmission members are not arranged so as to be mutually coaxial or flush, and the at least one shaft or shaft portion extends at an inclined angle to the base plate or housing walls.

25. Adjusting device according to claim 1, wherein plug-in clearances of the first and second transmission members are not arranged so as to be coaxial or flush, and the at least one shaft or shaft portion is configured so as to be curved or configured with a bending radius in such a way that the bending radius of the shaft or shaft portion is more than 250 mm.

26. Modular adjusting device for RF devices comprising:
a transmission base module;
a drive train comprising a transmission having a shaft, the transmission comprising first and second transmission members that are operatively connected together;
the transmission base module comprising a first snap-in and/or latch device for snapping in and retaining the first transmission member and a second snap-in and/or latch device for snapping in and retaining the second transmission member;
the first snap-in and/or latch device being structured to stop-delimit the first transmission member in an axial direction, the second snap-in and/or latch device being structured to stop-delimit the second transmission member in the axial direction;
the first and the second transmission members each comprising a plug-in coupling region connecting to the shaft for conjoint rotation by a plug-in connection.

* * * * *